UNITED STATES PATENT OFFICE.

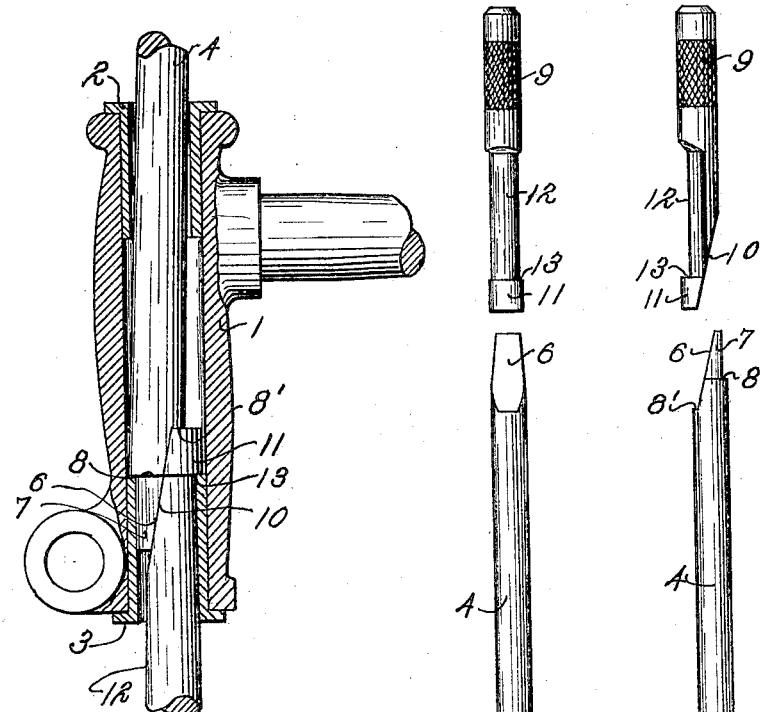

PERRY G. GULLY, OF ROSALIA, WASHINGTON.

BUSHING-REMOVER.

1,400,676. Specification of Letters Patent. Patented Dec. 20, 1921.

Application filed December 2, 1920. Serial No. 427,711.

*To all whom it may concern:*

Be it known that I, PERRY G. GULLY, a citizen of the United States, residing at Rosalia, in the county of Whitman and State of Washington, have invented certain new and useful Improvements in Bushing-Removers, of which the following is a specification.

The present invention relates to improvements in bushing removers designed especially as a punch tool for removing bearing bushings from the bearing sleeves or hubs of spindles, as utilized in the Ford and other types of automobile gearing, and of course the device of the invention is adapted for similar use in other connections for removing bushings from the tubular structures containing them.

In applying the bushings to the spindle bearing hub or sleeve, the former, which are usually of bronze or steel, are driven or forced into the spindle bearing, and are firmly retained therein. When the bushings become worn, the necessity arises for removing them to be replaced by others, and the tool of the present invention is designed for facile introduction into the spindle bearing, from alternate ends, where it is adapted to engage the inner edge of end of the bushing, and by tapping on the outer end of the tool, the bushing may be forced from the spindle bearing.

With the above purpose in view the invention consists essentially in a sectional tool having certain novel complementary features for engagement one with another and with the edges of the bushings, and in novel combinations and arrangements of parts as will be hereinafter more fully described and claimed.

In the accompanying drawings one complete example of the physical embodiment of the invention is illustrated, the parts being combined and arranged according to the best mode thus far devised for the practical application of the principles of the invention.

Figure 1 is a vertical central sectional view through a spindle bearing hub or sleeve, showing the tool of the invention in position to drive out the lower bushing of the bearing sleeve, parts of the tool being broken away for convenience of illustration.

Figs. 2 and 3 are views in elevation, taken at right angles, of the driven bar or section of the tool. Figs. 4 and 5 are similar, complementary views, of the driving or punching section of the tool.

In the preferred embodiment of the invention as illustrated in the drawings I have shown a spindle bearing hub or sleeve 1 of well known type with the upper and lower complementary bushings 2 and 3 as bearings for the spindle not shown.

The tool comprises a driving shank 4 of suitable metal and of proper diameter for facile insertion into the bushings 2 and 3 and is equipped with a head 5 which may be tapped with a hammer or other device. The end of the shank is fashioned with a beveled face 6, and terminates in a reduced extension 7, which construction forms an annular abrupt shoulder 8 on the shank opposite to the beveled face, while the beveled face 6 at its juncture with the shank is also formed with a shoulder 8'.

The driven bar 9 forming the tool end section is approximately the same diameter as the shank 4, and at one end is provided with a beveled face 10 extending obliquely thereof and complementary to the beveled face 6 of the driving shank, these two faces being designed to co-act as will be described. The bar 9 is fashioned with a head 11 created or formed by cutting out or grooving the bar at 12, which groove extends longitudinally along the exterior of the bar a sufficient distance for the purpose, and terminates in an abrupt shoulder 13 extending annularly approximately one half the circumference of the bar.

The utility and operation of the tool will be apparent from an inspection and study of Fig. 1 wherein the parts are in position for use in removing the lower bushing 3 from the spindle hub 1. The bar 9 has been inserted up into the bushing from below, and the shank has been introduced from above, through the bushing 2 and down into the spindle hub, the bar and shank being of such diameter as to permit ready insertion. The complementary beveled faces are brought into close contact with the shoulder 8' in contact with the end of the head 11, while the shoulder 8 of the shank is in contact with the inner edge of the bushing 3. The bar 9 has been inserted through the bushing a sufficient distance to permit the shoulder 13 to rest upon the edge of the bushing, and the two shoulders 8 and 13 thus form a continuous annular shoulder bearing against the inner edge of the bushing, while the bar and shank, and especially the shank, are free to pass through the spindle hub. Now by tapping or hammer blows on the head 5 of the driving shank it will be apparent that the two beveled edges or faces are driven into close frictional contact, and the impact applied to the tool is transferred to the inner edge of the bushing through the annular shoulders 8 and 13. The continued tapping or hammer blows will drive the bushing out through the lower end of the hub, thus freeing the bushing, and as the end of the shank and the bar 9 pass out at the lower end of the bushing, the shank and bar fall apart, after which the shank may be withdrawn through the upper open end of the hub and its bushing 2.

The bushing 2 may be removed in the same manner, but the sections of the tool are introduced into the spindle hub from opposite ends than those illustrated in Fig. 1. By the same operation, the upper bushing may be removed, the hammer blows being applied from below. The terms upper and lower as here used are relative terms, as it will be apparent that the tool may be used in connection with hubs located in horizontal position, or with other tubular structures from which a bushing is to be removed.

From the above description taken in connection with the drawings it is apparent that the tool may be manipulated with facility, and that the bushings may be quickly and conveniently removed without danger of marring the hub, and that the device possesses meritorious features rendering it a desirable instrumentality for performing its required functions.

Claims:

1. In a bushing remover the combination of a driving shank and a driven bar having complementary co-acting beveled friction faces and coacting shoulders on said shank and bar forming a continuous annular bearing for engagement with the edge of a bushing as described.

2. In a bushing remover the combination of a driving shank and a driven bar having complementary beveled friction faces, co-acting shoulders on said shank and bar for engagement with the edge of a bushing, a head on said beveled bar and a shoulder on the shank for engagement with said head for the purpose described.

3. In a device as described the combination of a driving shank and a driven bar having co-acting engaging means, co-acting shoulders on said shank and bar forming a continuous bearing for the edge of a bushing, a head on the bar and a shoulder on the shank coacting therewith, and said bar having an exterior groove for the purpose described.

In testimony whereof I affix my signature.

PERRY G. GULLY.